May 16, 1933. H. FORD 1,908,745
BRAKE
Filed April 5, 1930 2 Sheets-Sheet 2
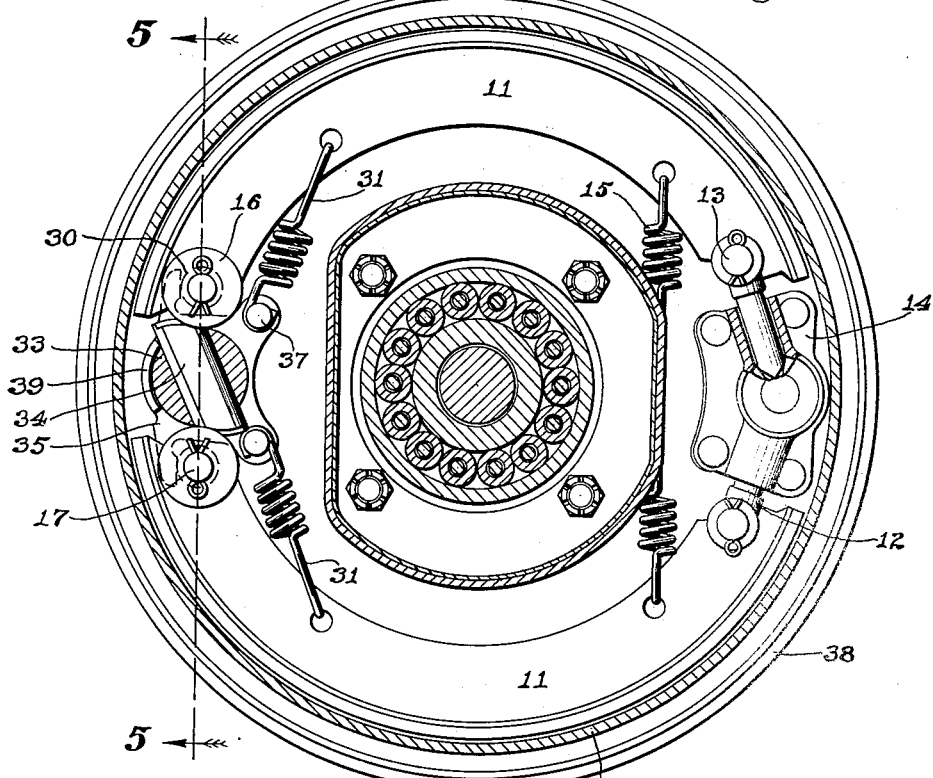
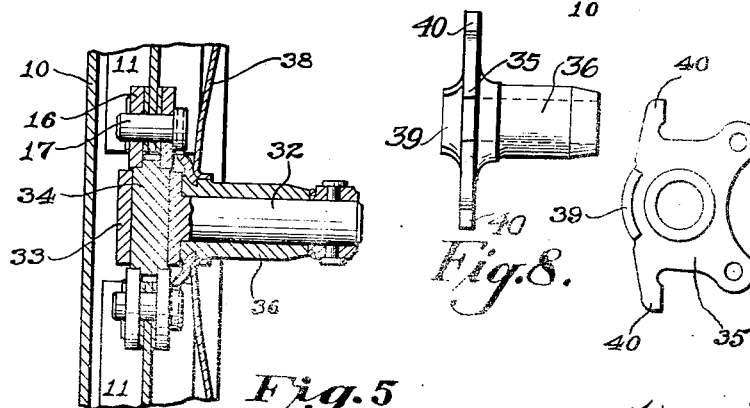
INVENTOR.
Henry Ford.
BY
ATTORNEY.

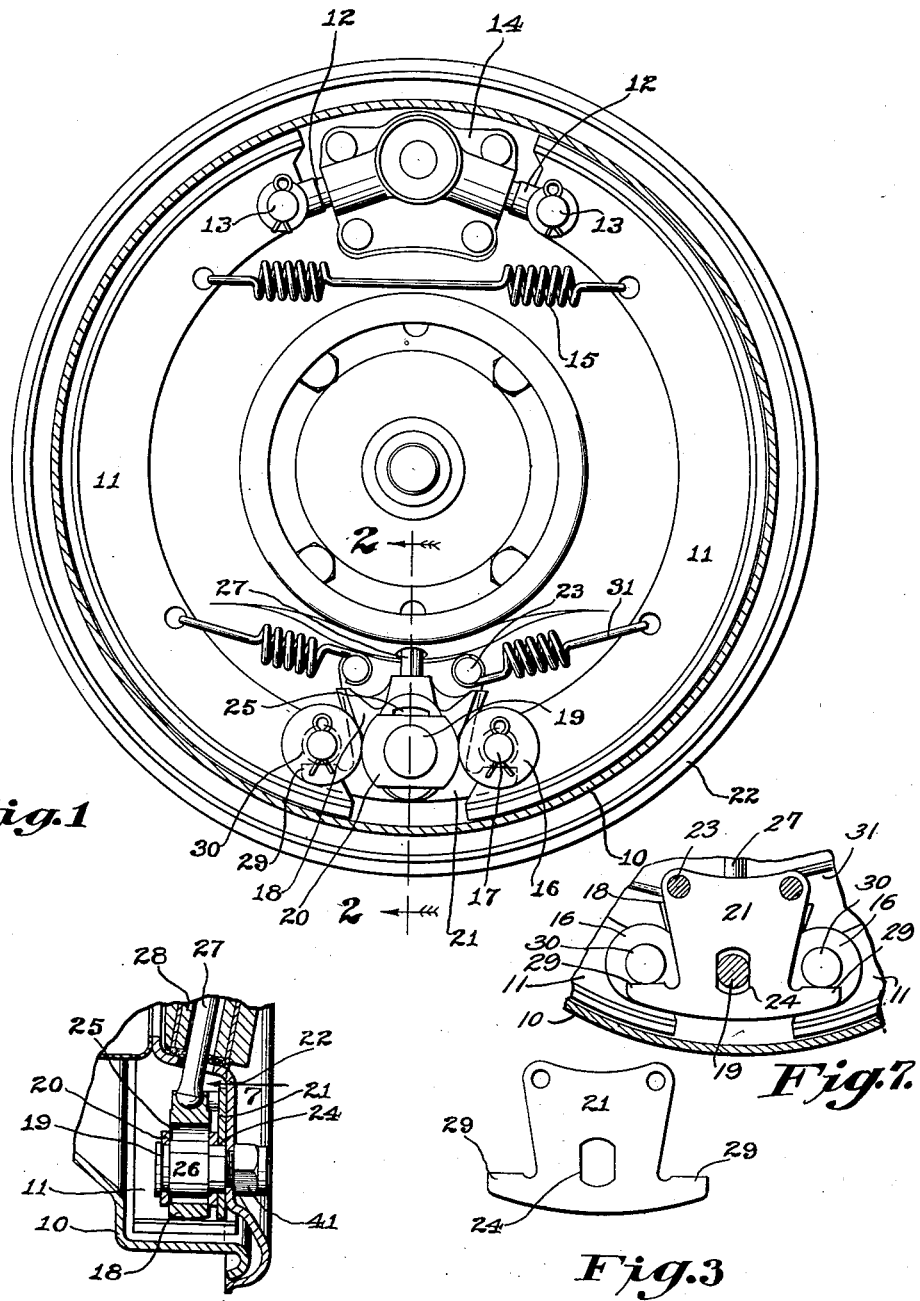

Patented May 16, 1933

1,908,745

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE

Application filed April 5, 1930. Serial No. 441,915.

The object of my invention is to provide a brake especially adapted for automobile use and in which a simple guide plate is provided which performs the several functions of, guiding the applied ends of the brake shoes, forming a released position stop for the brake applying cam, forming a bearing support for the brake operating shaft, and providing reinforcing for the brake anchor plate. Two adaptations of my improved device are shown, one incorporated in the rear wheel brakes and the other in the front or steering wheel brakes.

I desire to form the guide plate, used in connection with my front wheel brakes, as a stamping; and to form the plate used with the rear brakes, either as a stamping permanently secured to the operating shaft bearing or as a forging integral with this bearing.

With these and other objects in view, my invention consists in the arrangement, construction, and combination of the various parts of my improved device, as described in my specification, claimed in my claims, and illustrated in the accompanying drawings, in which:

Figure 1 shows a vertical sectional view through the brake drum of one of my improved front wheel brakes, the braking mechanism being shown in full to better illustrate the construction.

Figure 2 shows a sectional view taken on the line 2—2 of Figure 1.

Figure 3 shows a plan view of the guide plate used with the brake shown in Figure 1.

Figure 4 shows a sectional view through a rear wheel brake drum, parts of the brake adjusting device and brake operating mechanism being broken away to better illustrate the construction.

Figure 5 shows a sectional view taken on the line 5—5 of Figure 4.

Figure 6 shows a plan view of the guide plate and brake operating shaft used with the brake shown in Figure 4.

Figure 7 shows a sectional view, taken on the line 7—7 of Figure 2.

Figure 8 shows an alternate construction of the guide plate and brake operating shaft bearing, illustrating a one-piece construction wherein both the guide plate and bearing are formed as an integral forging.

Referring to the front wheel brake shown in Figure 1, an annular brake drum 10 is provided which encloses a pair of "T" section brake shoes 11 and the brake operating and adjusting devices used therewith. The adjacent upper ends of the two shoes 11 are pivotally secured to the forked ends of links 12 by means of pins 13. These links 12 extend into a brake adjusting housing 14 which is riveted to a brake anchor plate 22, the anchor plate thereby supporting the brakes and completing the enclosure therefor. The inner ends of the links 12 butt against the conical face of an adjusting wedge arranged so that operation of this wedge will move both links 12 outwardly in the adjusting housing to thereby spread the upper ends of the brake shoes. Sufficient clearance is allowed between the links 12 and the brake adjusting housing 14 so that these links are permitted a limited oscillatory movement around the adjusting wedge. A spring 15 extends between the upper ends of the brake shoes 11 to resiliently urge the links 12 into engagement with the adjusting wedge.

The lower ends of the brake shoes 11 are provided with spaced rollers 16 disposed one on each side of the center reinforcing web and secured thereto by means of pivot pins 17. Means are provided for spreading the lower ends of these shoes, which consists of a brake operating wedge 18 reciprocally mounted on a stud 19 between the lower adjacent ends of the brake shoes 11.

The guide plate which forms the principal feature of the invention disclosed herein, consists of a flat stamping 21 which is secured to the brake anchor plate 22 by riveting the ends of brake spring anchor posts 23 therethrough. Tension springs 31 extend from these posts to the lower portion of each brake shoe to return same to its inoperative position. The plate 21 is provided with an elongated opening 24 into which a correspondingly machined portion of the stud 19 extends so that when the stud is fastened to the brake anchor plate by the nut 41, it will be non-rotatably fastened thereto. The operating wedge 18 is provided with a slot 25 which co-acts with a pair of flatted sides 26 on the stud 19 thereby guiding the wedge for vertical reciprocation to thereby operate both brake shoes equally. An operating rod 27 extends through the spindle bolt 28 and anchor plate 22 to operate the wedge 18. A washer 20 is non-rotatably secured to the outer end of the stud 19 and forms a stop against which the outer roller on each shoe bears when in its inoperative position.

A pair of ears 29 extend outwardly from the two lower corners of the plate 21 and co-act with head 30 formed on the pivot pins 17. When the brake shoes are forced apart by the wedge 18 the lower ends thereof are guided by the head 30 sliding on the upper faces of the ears 29 so that chattering of the brakes is thereby prevented. It will be noted that these ears resist the downward motion of the brake shoes due to the thrust of the operating wedge independently of the links 12. Thus, the lower or applied ends of each brake shoe is supported by the ears 29 and wedge 18 which support prevents the shoes from chattering.

A further advantage arises in that the plate 21 forms a simple and inexpensive means of preventing the stud 19 from turning, thereby guiding the wedge to prevent unequal brake applying pressures on the shoes.

Referring now to Figures 4, 5, and 6, I have shown the adaptation of my improved device in connection with the rear wheel brakes of an automobile. The brake drum 10, shoes 11, adjusting mechanism 14, and retraction springs 15 and 31, are identical with those like-named parts used on the previously described brake, and have, therefore, been given the same reference numerals. The mechanism for adjusting the brakes is identical with that used on the front wheel brakes, but the mechanism for applying the brakes is somewhat different due to these wheels being of the non-steering type.

The means for applying this brake consists of a rotatably mounted shaft 32 having a head 33 in which a cam 34 is reciprocally mounted in position to co-act with the brake shoe rollers 16. Rotation of the shaft 32 clockwise from the position shown in Figure 4 will apparently spread the applying ends of the shoes 11 to thereby engage the brake. I have provided a plate 35, preferably stamped from sheet metal, which is fixedly secured to a bearing 36 in which the shaft 32 is mounted. The bearing 36 extends through the anchor plate 38 and is fixed in this position by the spring posts 37, the lower ends of which rivet the plate 35 and anchor plate 38 together. The upper ends of these posts are extended to form means of attaching the brake retraction springs 31.

The stamping 35 is provided with a lug 39 which is curved around one portion of the head 33 to form a retarded position stop for the brake operating cam 34. A pair of ears 40 extends from the outer corners of the plate 35, similar to the ears 29 shown in the previously described front wheel brake, and function with the roller pivot head in a like manner.

Although I have shown and described but one pair of front and rear wheel brakes, various changes therefrom may be made without departing from the spirit of this invention, and it is my intention to cover by my claims, such changes as may reasonably be included within the scope thereof.

I claim as my invention:

1. In a brake, a pair of brake shoes having adjacent separable ends, a brake anchor plate, a shaft bearing extending through said plate in which a brake operating shaft is rotatably mounted, and a guide plate formed integral with said bearing fixed to said anchor plate to thereby support said bearing.

2. In a device of the character described, a brake operating shaft having a head formed thereon in which a cam is slidably mounted to operate the brakes, an anchor plate, in which said shaft is journalled, and a guide plate secured thereto having a projection curved about said head to form a retracted position stop for said cam.

3. In a device of the character described, a guide plate and shaft bearing unit secured to an anchor plate, said guide plate having a stop extending therefrom to limit the rotary movement of a shaft mounted in said bearing.

4. In a device of the character described, a pair of brake shoes, a brake anchor plate having a guide plate and shaft bearing unit secured thereto, said bearing extending through the anchor plate, and a pair of ears extending laterally from said guide plate controlling the movement of said brake shoes.

5. In a device of the character described, a guide plate and bearing unit secured to a brake anchor plate, said plate having ears extending laterally therefrom to guide a pair of brake shoes and having a stop extending outwardly therefrom to limit the rotary movement of a brake operating shaft rotatably mounted in said bearing.

6. In a device for actuating a brake, an internal brake shoe, a rotatable brake shaft adapted to force said shoe into engagement with the brake drum, a bearing for rotatably mounting said shaft, and an ear extending radially from said bearing to guide the engaging and retracting movements of said shoe.

7. In a device for actuating a brake, an internal brake shoe, a rotatable brake shaft adapted to force said shoe into engagement with the brake drum, a bearing for rotatably mounting said shaft, and an ear formed integrally with and extending radially from said bearing to guide the engaging and retracting movements of said shoe.

8. In a device for actuating a brake, an internal brake shoe, a rotatable brake shaft adapted to force said shoe into engagement with the brake drum, a bearing for rotatably mounting said shaft, said bearing having an ear extending radially from said bearing to guide the engaging and retracting movements of said shoe, and means for fastening said ear in position to thereby support said bearing.

9. A brake comprising an anchor plate having a brake shoe mounted thereon and a brake drum, a rotatable brake shaft extending through said plate adapted to force said shoe into engagement with the brake drum, a bearing extending through said plate rotatably supporting said shaft, and an ear extending radially from said bearing on the shoe side of said plate to guide the engaging and retracting movements of said shoe.

10. A brake comprising an anchor plate having a brake shoe mounted thereon and a brake drum, a rotatable brake shaft extending through said plate adapted to force said shoe into engagement with the brake drum, a bearing extending through said plate rotatably supporting said shaft, said bearing having an ear extending radially from said bearing on the shoe side of said plate to guide the engaging and retracting movements of said shoe, and means for fastening said ear to said plate to thereby support said bearing.

11. In a device for actuating a pair of brake shoes having adjacent separable ends, a cam disposed between said ends and operated by the rotation of a brake shaft, a bearing for said shaft, and a guide plate on said bearing whereby said bearing is fixedly secured in position, said guide plate having ears extending therefrom in substantial alignment with the operating paths of said brake shoe ends and which ears coact with said shoes to guide their engaging and retracting movements.

12. In a device for actuating a pair of brake shoes having adjacent separable ends, a brake shaft associated therewith whereby rotation of said shaft will separate said ends to apply the brakes, a bearing for said shaft, a guide plate on said bearing whereby said bearing is fixedly secured in position, said guide plate having ears extending therefrom in substantial alignment with the paths traveled by said shoe ends when being applied, which ears coact with said shoes to guide their applying movements, and means for fixedly securing said plate in position to thereby support said bearing.

13. A brake having, in combination with an anchor plate and brake shoes having adjacent separable ends, a pivot in each of said separable shoe ends carrying thrust rollers thereon, a shaft having a cam acting on said rollers to apply the brakes, a shaft bearing extending through the anchor plate in which said shaft is journaled, and a guide plate on said bearing whereby said bearing is fixedly secured to said anchor plate, which guide plate is provided with guide surfaces engaged by the ends of said roller pivots to guide the engaging and retracting movements of said brake shoes.

14. A brake having, in combination with an anchor plate and shoes having adjacent separable ends, a pivot in each of said separable shoe ends carrying thrust rollers thereon, a shaft having a cam acting on said rollers to apply the brakes, a shaft bearing extending through the anchor plate in which said shaft is journaled, and a guide plate on said bearing whereby said bearing is fixedly secured to said anchor plate, which guide plate is provided with a pair of ears extending oppositely and radially from said bearing and which ears coact with the ends of said roller pivots to guide the engaging and retracting movements of said brake shoes.

15. A brake having, in combination with an anchor plate and brake shoes having adjacent separable ends, a brake operating shaft disposed between said shoes having a cam actuated thereby to separate said shoes, a bearing for said shaft having a guide plate formed therewith, said guide plate being secured to said anchor plate to support said bearing and said guide plate having ears extending therefrom substantially in line with the operating paths of the separable ends of said shoes whereby said shoes are guided in their engaging and retracting movements.

16. A brake operating cam shaft bracket adapted to be secured to a brake anchor plate, comprising a shaft bearing and guide plate, said guide plate being secured to the brake anchor plate by a pair of pins to thereby support said bearing, the pins for attaching the guide plate to the anchor plate serving as posts for anchoring a pair of brake return springs.

HENRY FORD.